United States Patent
Dering et al.

(10) Patent No.: US 10,193,166 B2
(45) Date of Patent: Jan. 29, 2019

(54) FUEL CELL SYSTEM

(71) Applicant: Eberspächer Climate Control Systems GmbH & Co. KG, Esslingen (DE)

(72) Inventors: Oleg Dering, Stuttgart (DE); Manfred Stute, Esslingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 724 days.

(21) Appl. No.: 14/200,673

(22) Filed: Mar. 7, 2014

(65) Prior Publication Data

US 2014/0255808 A1   Sep. 11, 2014

(30) Foreign Application Priority Data

Mar. 8, 2013 (DE) .................. 10 2013 204 023

(51) Int. Cl.
| | |
|---|---|
| H01M 8/04 | (2016.01) |
| H01M 8/04007 | (2016.01) |
| H01M 8/0612 | (2016.01) |
| H01M 8/04014 | (2016.01) |
| H01M 8/04089 | (2016.01) |

(52) U.S. Cl.
CPC ... *H01M 8/04067* (2013.01); *H01M 8/04014* (2013.01); *H01M 8/04097* (2013.01); *H01M 8/0618* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | | | |
|---|---|---|---|---|
| 4,465,948 A | * | 8/1984 | Oyama | H02K 9/06 310/58 |
| 5,209,190 A | * | 5/1993 | Paul | F01B 3/0032 123/43 AA |
| 2005/0199207 A1 | * | 9/2005 | Augenstein | B60H 1/038 123/142.5 R |

FOREIGN PATENT DOCUMENTS

| | | |
|---|---|---|
| DE | 10 2006 021 866 A1 | 11/2007 |
| DE | 10 2007 019 359 A1 | 10/2008 |
| EP | 1855342 A2 * 11/2007 | ........ H01M 8/04097 |

* cited by examiner

Primary Examiner — Barbara L Gilliam
Assistant Examiner — Zhongqing Wei
(74) Attorney, Agent, or Firm — McGlew and Tuttle, P.C.

(57) ABSTRACT

A fuel cell system (1) includes a reformer (2), for generating a reformate gas, a fuel cell (3) for generating electric current from cathode air and reformate gas, an air supply (4), which draws in ambient air and splits this at least into reformer air and cathode air, sends the reformer air via a reformer air line (15) in the direction of the reformer and sends the cathode air via a cathode air line (16) in the direction of a cathode side (11). A recirculating line (20) connects an anode side (10) to the reformer (2). A hot gas delivery (24), which contains a hot gas path (26), is arranged in the recirculating line for driving the anode waste. A cooling air path (27), which is integrated into the cathode air line, through which the reformer air or cathode air flows, reduces thermal load of the hot gas delivery.

20 Claims, 2 Drawing Sheets

FUEL CELL SYSTEM

CROSS REFERENCE TO RELATED APPLICATIONS

This application claims the benefit of priority under 35 U.S.C. § 119 of German Patent Application DE 10 2013 204 023.7 filed Mar. 8, 2013, the entire contents of which are incorporated herein by reference.

FIELD OF THE INVENTION

The present invention pertains to a fuel cell system, especially as an auxiliary power supply means of a motor vehicle.

BACKGROUND OF THE INVENTION

A fuel cell system usually comprises at least one fuel cell for generating electric current from cathode air and reformate gas. Such a fuel cell is usually composed of a plurality of individual fuel cell elements, which are stacked on one another and can also be called a fuel cell stack. To generate reformate gas, the fuel cell system may be equipped with a reformer, which generates the reformate gas from a fuel and reformer air. The fuel is usually a hydrocarbon. The reformate gas contains hydrogen gas and carbon monoxide. The fuel cell system may be equipped, in addition, with an air supply means, which draws in ambient air by means of an air delivery means from the surrounding area of the fuel cell system and splits this air at least into reformer air and cathode air. The reformer air can then be fed to the reformer via a reformer air line, while the cathode air can be fed to the at least one fuel cell via a cathode air line of a cathode side. Furthermore, provisions may be made in such a fuel cell system for sending anode gas of an anode side of the at least one fuel cell in the direction of the reformer by means of a recirculating line in order to thus make it possible to return anode waste gas from the respective fuel cell to the reformer. A hot gas delivery means, which contains a hot gas path, through which the anode waste gas flows, may be arranged in the recirculating line to drive the anode waste gas.

The respective fuel cell may be advantageously configured as an SOFC fuel cell, where SOFC stands for Solid Oxide Fuel Cell. Such an SOFC may also be called a high-temperature fuel cell. Comparatively high temperatures may consequently develop during the operation of such an SOFC. In particular, the recycled anode waste gas may be relatively hot as well, so that the hot gas delivery means arranged in the recirculating line is exposed to a high thermal load. To reduce the thermal load of the hot gas delivery, it is possible to cool the recycled anode gas by means of a corresponding heat exchanger. However, the apparatus necessary for this is relatively complicated.

SUMMARY OF THE INVENTION

The object of the present invention is to provide an improved embodiment for a fuel cell system of the type mentioned in the introduction, which is characterized especially by efficient cooling of the hot gas delivery means or hot gas delivery device.

According to the invention a fuel cell system is provided comprising a reformer for generating a reformate gas from reformer air and fuel and a fuel cell for generating electric current from cathode air and reformate gas, the fuel cell comprising a cathode side and an anode side. An air delivery means or air delivery device delivers air to an air supply means that receives ambient air from the surrounding area of the fuel cell system, via the air delivery means, and splits the air at least into reformer air and cathode air and sends the reformer air via a reformer air line in the direction of the reformer and sends the cathode air via a cathode air line in the direction of the cathode side. A recirculating line connects the anode side to the reformer and recycles anode waste gas from the fuel cell to the reformer. A hot gas delivery means is arranged in the recirculating line for driving the anode waste gas. The hot gas delivery means contains a hot gas path, through which the anode waste gas flows. The hot gas delivery means contains a cooling air path, which is integrated into the reformer air line or into the cathode air line and through which the reformer air or the cathode air flows.

The present invention is based on the general idea of equipping the hot gas delivery means with at least one cooling air path, through which the reformer air or cathode air can be sent. The at least one cooling air path may be integrated for this into the reformer air line or into the cathode air line, so that the reformer air or cathode air flows as cooling air through the hot gas delivery means during the operation of the fuel cell system. Efficient cooling of the hot gas delivery means can be achieved in this manner without an additional cooling air flow having to be generated, because the reformer air or cathode air must be sent to the reformer or to the fuel cell anyway. Preheating of the reformer air upstream of the reformer and of the cathode air upstream of the respective fuel cell is achieved at the same time due to the utilization of the reformer air or cathode air to cool the hot gas delivery means, which improves the energy efficiency of the fuel cell system. Since the air supply means comprises an air delivery means anyway, an additional cooling air delivery means can be omitted in the fuel cell system according to the present invention, as a result of which the apparatus needed becomes less complicated. At the same time, no appreciable additional quantity of energy is needed to drive such a cooling air delivery means. This measure also leads ultimately to an increase in the energy efficiency of the fuel cell system.

In particular, a complicated cooling of the anode gas upstream of the waste gas delivery means can be eliminated. Uncooled anode gas will thus preferably reach the hot gas delivery means.

Corresponding to an advantageous embodiment, the cooling air path may be integrated into the reformer air line, and the reformer air line is connected to the recirculating line downstream of the hot gas delivery means. The reformer air is mixed in this manner with the recycled anode waste gas after cooling of the hot gas delivery means, so that a mixture of anode waste gas and reformer air is fed to the reformer.

As an alternative, the cooling air path may be integrated into the cathode air line.

Preferred is an embodiment in which the hot gas delivery means contains a first cooling air path and a second cooling air path, wherein the first cooling air path is integrated into the reformer air line, while the second cooling air path is integrated into the cathode air line. The two cooling air paths are advantageously separated from one another within the hot gas delivery means and are advantageously more or less sealed against one another. Thus, essentially only reformer air flows through the first cooling air path, while essentially only cathode air flows through the second cooling air path. As a result, different cooling functions or cooling tasks can be performed within the hot gas delivery means by means of the two separate cooling air paths, for example, depending on the cooling air flow available. For example, a volume flow of the cathode air is markedly larger than a volume flow of the reformer air in a normal operating state.

In an advantageous embodiment, the hot gas delivery means may have a delivery wheel arranged in the hot gas path and rotatable about an axis of rotation for driving the anode waste gas. For example, the hot gas delivery means may be designed in the manner of a radial compressor. The hot gas delivery means may have only one electric motor, whose rotor is connected to the delivery wheel such that they rotate in unison. A cooling chamber, which is arranged axially between the delivery wheel and the electric motor in relation to the axis of rotation, may be advantageously formed now in the hot gas delivery means. This cooling chamber is integrated into the first cooling air path. The electric motor is thus thermally separated in this manner from the delivery wheel, as a result of which the axial heating of the electric motor can be reduced.

Corresponding to an advantageous variant, a cooling disk connected to the rotor such that they rotate in unison may be arranged in the cooling chamber. Such a cooling disk prevents, on the one hand, the transmission of radiant heat from the delivery wheel to the electric motor. On the other hand, the cooling disk absorbs heat of the rotor directly and distributes same to a larger surface, so that efficient cooling of the rotor can also be achieved by means of the cooling air flow in the first cooling air path or in the cooling chamber in order to reduce the quantity of heat introduced into the electric motor.

According to another advantageous variant, a stator of the electric motor may be enveloped by a cooling jacket, which is integrated into a second cooling air path of the hot gas delivery means. The second cooling air path is advantageously separated from the first cooling air path. By providing such a cooling jacket, heat can now also be removed from the electric motor radially, as a result of which efficient cooling of the electric motor can be achieved.

As was mentioned already, reformer air preferably flows in the first cooling air path, while cathode air preferably flows in the second cooling air path. The cooling chamber can correspondingly be integrated into the reformer air line in an advantageous variant, while the cooling jacket is integrated into the cathode air line.

Corresponding to another advantageous variant, the delivery wheel may be arranged in a delivery chamber, which is integrated into the hot gas path, while the cooling chamber is arranged axially between the delivery chamber and the cooling jacket in relation to the axis of rotation. The cooling chamber thus also brings about a thermal uncoupling between the delivery chamber and the cooling jacket.

Provisions may be made in another advantageous embodiment for the first cooling air path to be sealed against the hot gas path, so that the cooling air and the anode waste gas can be sent through the hot gas delivery means such that the media are separated from one another.

By contrast, provisions may be made in an alternative embodiment for providing between the first cooling air path and the hot gas path a leak (fluid passage), which may be arranged especially on the suction side of a delivery wheel arranged in the hot gas path for driving the anode waste gas. By taking into account or providing a corresponding pressure gradient between the first cooling air path and the hot gas path, it is preferably achieved that even though cooling air, preferably reformer air, is mixed with the anode waste gas already within the hot gas delivery means in the form of an intended leak, hot anode waste gas is prevented from flowing over into the first cooling air path. Cooling air can thus enter, in particular, the delivery chamber from the cooling chamber, while hot anode waste gas cannot pass over from the delivery chamber into the cooling chamber. To make it possible to guarantee a corresponding pressure gradient, the intended leak between the cooling chamber and the delivery chamber is preferably arranged on the suction side of the delivery wheel. However, if the pressure is higher in the reformer air than on the pressure side of the delivery wheel, the leak may also be arranged downstream of the delivery wheel.

The second cooling air path may be sealed against the hot gas path and/or against the first cooling air path in another advantageous embodiment, as a result of which it is possible to send the cathode air through the hot gas delivery means such that this medium is separated from the reformer air and/or from the anode waste gas.

It is apparent that the above-mentioned features, which will also be explained below, can be used not only in the particular combination given, but also in other combinations or alone, without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
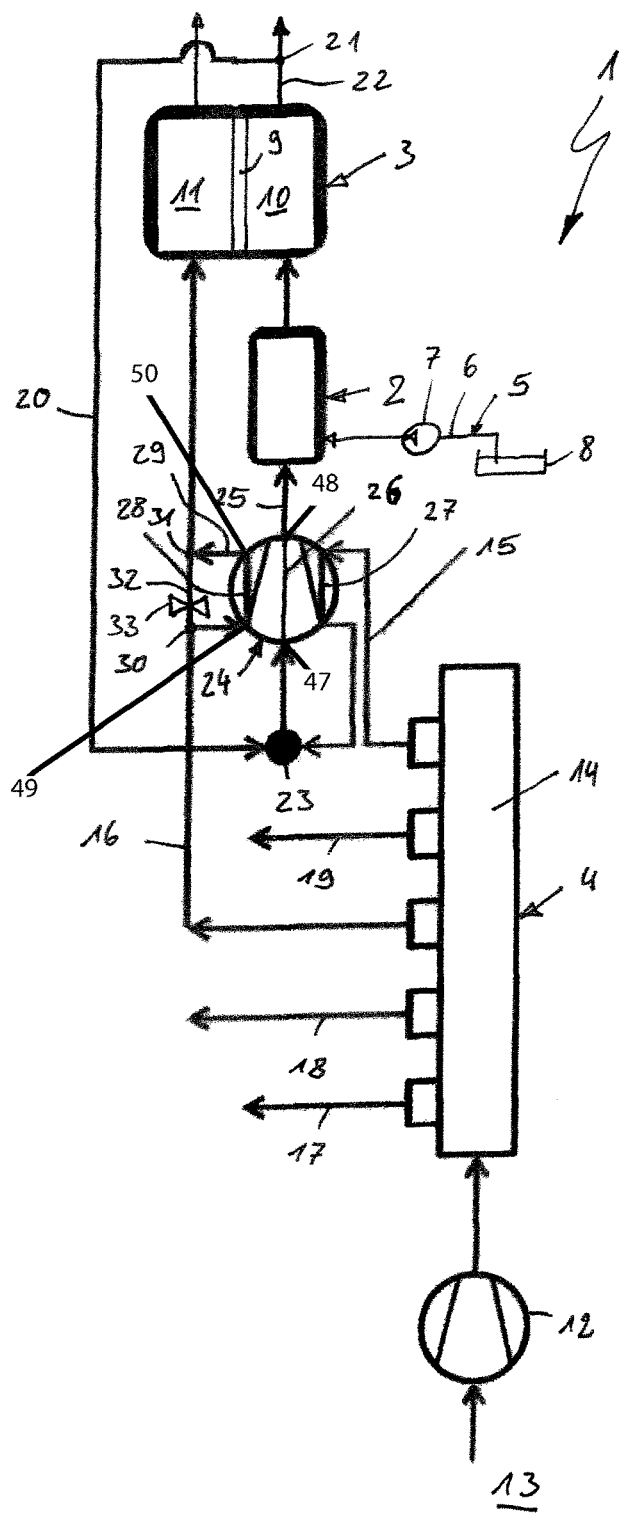
FIG. 1 is a highly simplified, block diagram-like general schematic view of a fuel cell system according to the invention.

Referring to the drawings in particular, corresponding to FIG. 1, a fuel cell system 1, which may be used as an APU in motor vehicle, wherein APU stands for Auxiliary Power Unit, comprises a reformer 2, at least one fuel cell 3 and an air supply means 4. The reformer 2 is used to generate a reformate gas from reformer air and from fuel. The supply with reformer air takes place via the air supply means 4. The fuel is fed via a fuel supply means 5, which comprises, for example, a fuel line 6 and a fuel delivery means 7 arranged therein. The fuel line 6 connects a fuel tank 8 to the reformer 2.

The fuel cell 3 is used to generate electric current from cathode air and from reformate gas. The fuel cell 3 has for this, in the usual manner, an electrolyte 9, which separates an anode side 10 from a cathode side 11 in the fuel cell 3. It is clear that the fuel cell 3 may be designed in the usual design as a fuel cell stack, in which a plurality of fuel cell elements are layered on top of one another in a stack-like manner.

The air supply means 4 comprises an air delivery means 12, which draws ambient air from a surrounding area 13 and splits this via an air distribution means 14 at least into reformer air and cathode air. A reformer air line 15 leads from the air distribution means 14 in the direction of the reformer. Further, a cathode air line 16 leads from the air distribution means 14 in the direction of the cathode side 11 of the fuel cell 3. Furthermore, provisions may be made for further air lines 17 and 18 to lead from the air distributor strip 14 to other components of the fuel cell system. Finally, a bypass air line 19 is also shown here as a suggestion, which likewise leads from the air distributor strip 14 and bypasses both the reformer 2 and the fuel cell 3 and possibly also the residual gas burner. The bypass line 19 may be connected, for example, to a waste gas line of the fuel cell system 1. The bypass line 19 may also lead directly again into the surrounding area 13. The bypass air line 19 may be used, for example, to regulate the volume flow or the pressure of the air flows if the air delivery means 12 is operating constantly. As an alternative, the bypass air line 19 may lead to the cathode side 11 of the fuel cell 3 in parallel to the cathode air line 16, for example, in order to cool the fuel cell 3 or to cool the cathode air. The bypass air line 19 can thus be used to regulate the temperature of the fuel cell 23 in this case.

The fuel cell system 1 being presented here comprises, in addition, a recirculating line 20, which ultimately connects the anode side 10 to the reformer 2 and is connected for this to an anode waste gas line 22 via a tapping point 21 and is fluidically connected to the reformer air line 15 via an inlet point 23. A hot gas delivery means 24, which drives (delivers) the anode waste gas to be recycled, is arranged in the recirculating line 20. The reformer air line 15 is connected to the recirculating line 20 via the inlet point 23 upstream of the hot gas delivery means 24 in the embodiment shown in FIG. 1, so that the reformer air line 15 is not connected here directly to the reformer 2, but only indirectly, namely, via a common section 25 of the recirculating line 20, which section leads from the inlet point 23 to the reformer 2 and in which the hot gas delivery means 24 is located.

The hot gas delivery means 24 contains a hot gas path 26, through which the anode waste gas flows. The hot gas delivery means 24 contains, besides, a first cooling air path 27, which is integrated into the reformer air line 15, as well as a second cooling air path 28, which is integrated into the cathode air line 16. Reformer air can thus be passed through the first cooling air path 27 and cathode air through the second cooling air path 28 in order to thus cool the hot gas delivery means 24 efficiently.

The reformer air line 15 is connected in this case to the hot gas delivery means 24 such that the reformer air flows first through the first cooling air path 27 and is fed to the recycled anode waste gas flow only thereafter.

The first cooling air path 27 is preferably such that the media are separated in it, i.e., it is led through the hot gas delivery means 24 such that it is extensively sealed against the hot gas path 26 and against the second cooling air path 28. The second cooling air path 28 is preferably such that the media are separated in it, i.e., it is led through the hot gas delivery means 24 such that it is extensively sealed against the first cooling air path 27 and against the hot gas path 26.

In the embodiment shown in FIG. 1, the cathode air line 16 has a cooling branch 29, which branches off from the main line of the cathode air line 16 at a first connection point 30 and passes through the second cooling air path 28 and is returned again into the main line of the cathode air line 16 at a second connection point 31. In addition, a cooling branch bypass 32, which directly connects the two connection points 30, 31 and which can be controlled by means of a control valve 33, is provided in the example according to FIG. 1. The percentage of cathode air, which flows through the cooling branch 29 and thus through the second cooling air path 28, can thus be set by means of the control valve 33. Any desired splitting is conceivable here, in principle, so that between 0% and 100% of the volume flow of the cathode air can be sent through the cooling branch bypass 32. It is also conceivable to set a fixed split permanently. In particular, a suitable throttling means may be provided in this case instead of the control valve 33.

Figure 2:
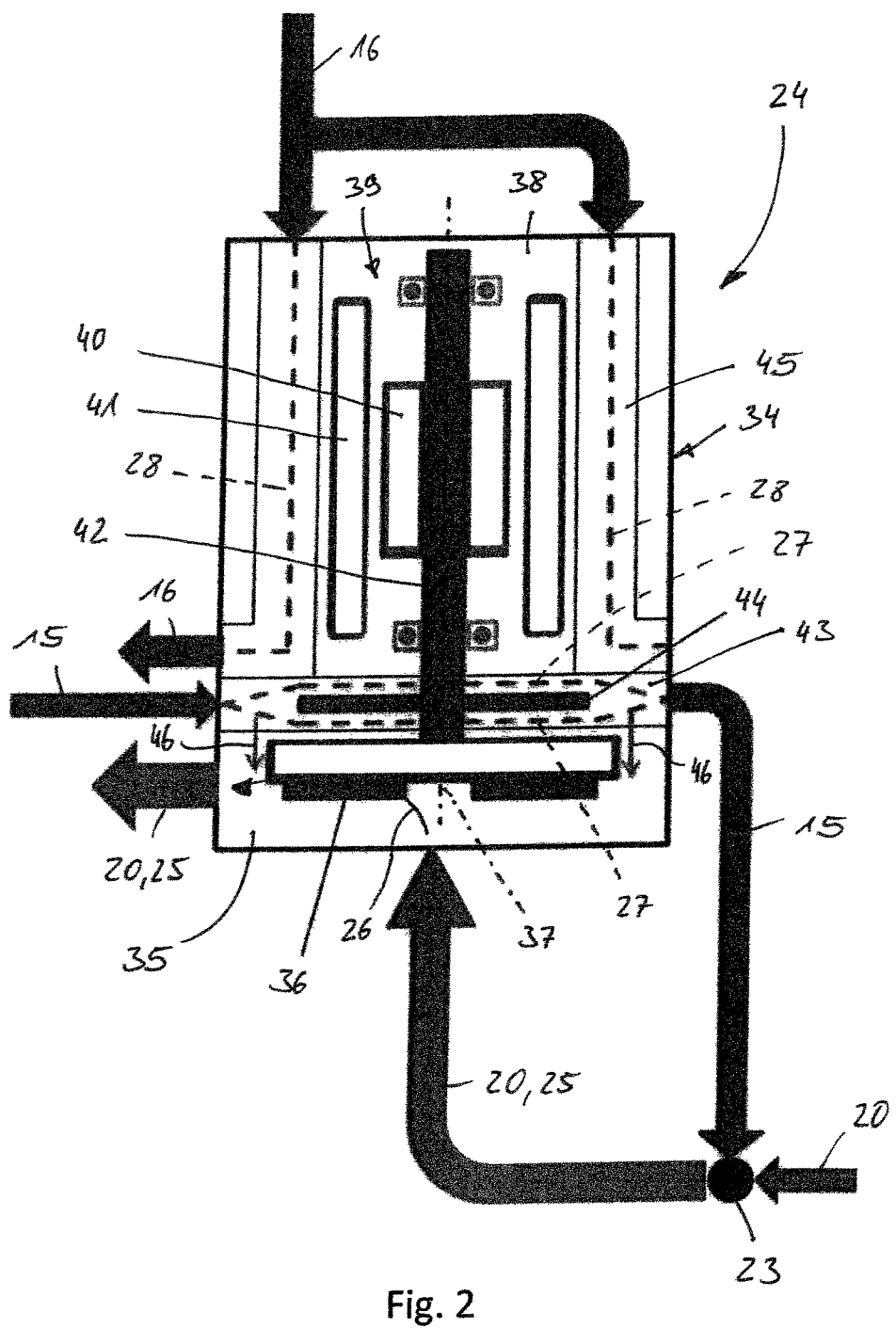
FIG. 2 is a highly simplified general sectional view of a hot gas delivery means of the fuel cell system.

Corresponding to FIG. 2, the hot gas delivery means 24 may contain in a housing 34 a delivery chamber 35, through which the hot gas path 26 is led and in which a delivery wheel 36 is arranged for driving the anode waste gas, wherein the delivery wheel 36 can rotate about an axis of rotation 37. The delivery wheel 36 is, in particular, a radial compressor wheel, whose suction side is arranged axially and whose pressure side is arranged radially. As an alternative, the delivery wheel 36 may also be designed, for example, as a diagonal wheel. The hot gas delivery means 24 contains, in addition, in the housing 34 a motor space 38, in which an electric motor 39 is arranged, which has a rotor 40 and a stator 41 in the usual manner. The rotor 40 has a driving shaft 42, which is connected to the delivery wheel 36 such that they rotate in unison. The rotor 40 and the driving shaft 42 rotate about the axis of rotation 37 during the operation of the electric motor 39. In addition, a cooling chamber 43, through which leads the first cooling air path 27, is arranged in the housing 34 axially between the delivery wheel 35 and the motor space 38 relative to the axis of rotation 37. A cooling disk 44, which is connected to the driving shaft 42 such that they rotate in unison and which is connected to the drive shaft 42 in a heat-transmitting manner and which is arranged in the cooling chamber 43 such that the reformer air can flow around it in the cooling chamber 43, is arranged in the housing 34 axially between the delivery chamber 35 and the motor space 38 relative to the axis of rotation 37.

The housing 34 contains, in addition, a cooling jacket 45, which envelopes the stator 41 and encloses this in the circumferential direction especially in relation to the axis of rotation 37. The second cooling air path 28 is led through this cooling jacket 45.

The cooling chamber 43 is arranged axially between the delivery chamber 35 and the cooling jacket in relation to the axis of rotation 37.

The second cooling air path 28 is advantageously sealed against the first cooling air path 27, as a result of which it is inevitably also sealed against the hot gas path 26. Contrary to this, a leak 46, which is suggested by arrows in FIG. 2, may be present between the first cooling air path 27 and the hot gas path 26. If the pressure in the reformer air is higher than on the pressure side of the delivery wheel 36, this leakage 46 may be arranged, as is shown in FIG. 2, downstream of the delivery wheel 36. If, however, the pressure in the reformer air is lower than on the pressure side of the delivery wheel 3 but is higher than on the suction side of the delivery wheel 36, the leak 46 is advantageously formed upstream of the delivery wheel 36, unlike in the view shown in FIG. 2.

It is remarkable that the anode gas recycling shown here manages without cooling of the recycled anode gas upstream of the hot gas delivery means 24.

While specific embodiments of the invention have been shown and described in detail to illustrate the application of the principles of the invention, it will be understood that the invention may be embodied otherwise without departing from such principles.

What is claimed is:

1. A fuel cell system, as an auxiliary power supply unit of a motor vehicle, the fuel cell system comprising:
   a reformer for generating a reformate gas from reformer air and fuel;
   a fuel cell for generating electric current from cathode air and reformate gas, said fuel cell comprising a cathode side and an anode side;
   an air delivery means for delivering air;
   a reformer air line;
   a cathode air line;
   an air supply means for receiving ambient air from the surrounding area of the fuel cell system by said air delivery means and for splitting the air at least into reformer air and cathode air and sending the reformer air via said reformer air line in the direction of said reformer and sending the cathode air via said cathode air line in the direction of said cathode side;
   a recirculating line connecting said anode side to said reformer and recycling anode waste gas from said fuel cell to said reformer;
   a hot gas delivery means, said hot gas delivery means being arranged in said recirculating line for driving the anode waste gas, wherein:
   said hot gas delivery means contains a hot gas path, through which the anode waste gas flows, said hot gas delivery means delivering said anode waste gas exclusively to said reformer;
   said hot gas delivery means contains a cooling air path, said cooling air path being integrated into said reformer air line or into said cathode air line and the reformer air or the cathode air passing through said cooling air path, wherein a flow of said reformer air or said cathode air through an interior of said hot gas delivery means is separate from a flow of said anode waste gas through said interior of said hot gas delivery means; and
   said cooling air path is sealed against said hot gas path.

2. The fuel cell system in accordance with claim 1, wherein said cooling air path is integrated into said reformer air line, wherein said reformer air line is connected to said recirculating line downstream of said hot gas delivery means.

3. The fuel cell system in accordance with claim 1, wherein:
   said cooling air path is integrated into said reformer air line; and
   said hot gas delivery means contains an additional cooling air path, which is integrated into said cathode air line.

4. The fuel cell system in accordance with claim 1, wherein:
   said hot gas delivery means comprises a delivery wheel arranged in said hot gas path and rotatable about an axis of rotation for driving the anode waste gas;
   said hot gas delivery means comprises an electric motor with a rotor connected to said delivery wheel such that said rotor and said delivery wheel rotate in unison; and
   said hot gas delivery means, axially between said delivery wheel and said electric motor in relation to the axis of rotation, comprises a cooling chamber integrated into said cooling air path.

5. The fuel cell system in accordance with claim 4, wherein:
   said hot gas delivery means comprises a cooling disk arranged in said cooling chamber and connected to said rotor in such a way that said cooling disk and said rotor rotate in unison.

6. The fuel cell system in accordance with claim 4, wherein:
   said hot gas delivery means comprises an additional cooling air path, which is integrated into said reformer air line or into said cathode air line and through which the reformer air or the cathode air flows;
   said hot gas delivery means comprises a cooling jacket;
   said electric motor comprises a stator;
   said electric motor is located in said interior of said hot gas delivery means;
   said electric motor is enveloped by said cooling jacket, said cooling jacket being integrated into said additional cooling air path of said hot gas delivery means;
   said hot gas delivery means comprises a housing;
   said housing defines said interior of said hot gas delivery means;
   said housing comprises a cooling path inlet, a cooling path outlet, a hot gas path inlet and a hot gas path outlet;
   said cooling path inlet is located at a spaced location from said cooling path outlet;
   said hot gas path inlet is located at a spaced location from said hot gas path outlet.

7. The fuel cell system in accordance with claim 6, wherein:
   said cooling chamber is integrated into said reformer air line; and
   said cooling jacket is integrated into said cathode air line.

8. The fuel cell system in accordance with claim 6, wherein:
   said delivery wheel is arranged in a delivery chamber which is integrated into said hot gas path; and
   said cooling chamber is arranged axially between said delivery chamber and said cooling jacket in relation to an axis of rotation.

9. The fuel cell system in accordance with claim 3, wherein, said additional cooling air path is sealed against at least one of said hot gas path and said cooling air path.

10. A fuel cell system comprising:
    a reformer generating a reformate gas from reformer air and fuel;
    a fuel cell generating electric current from cathode air and reformate gas, said fuel cell comprising a cathode side and an anode side;
    an air delivery device delivering air;
    a reformer air line;
    a cathode air line;
    an air supply device receiving ambient air from a surrounding area of the fuel cell system driven by said air delivery device dividing portions of the received air into at least reformer air and cathode air with connections for the reformer air to said reformer air line, in a direction of said reformer, and for the cathode air to said cathode air line, in a direction of said cathode side;
    a recirculating line connecting said anode side to said reformer and recycling anode waste gas from said fuel cell to said reformer; and
    a hot gas delivery device forming a part of said recirculating line defining a delivery device hot gas path, through which the anode waste gas flows, and driving the anode waste gas, said hot gas delivery device also defining a delivery device cooling air path forming a part of at least one of said reformer air line and said cathode air line, wherein a flow of at least one of the reformer air and the cathode air in the cooling path in the hot gas delivery device is separate from a flow of the anode waste gas in the hot gas path in the hot gas delivery device, said cooling air path being sealed against said hot gas path, said hot gas delivery device comprising a housing, said housing comprising a hot gas path outlet and a cooling path outlet, said cooling path outlet being at a spaced location from said hot gas path outlet, said housing comprising a cooling path inlet and a hot gas path inlet, said cooling path inlet being located at a spaced location from said hot gas path inlet.

11. The fuel cell system in accordance with claim 10, wherein said delivery device cooling air path forms a part of said reformer air line, wherein said reformer air line is connected to said recirculating line downstream of said hot gas delivery device.

12. The fuel cell system in accordance with claim 10, wherein:
said delivery device cooling air path forms a part of said reformer air line; and
said hot gas delivery device contains an additional delivery device cooling air path, which forms a part of said cathode air line.

13. The fuel cell system in accordance with claim 10, wherein:
said hot gas delivery device comprises a delivery wheel arranged in said delivery device hot gas path and rotatable about an axis of rotation for driving the anode waste gas;
said hot gas delivery device comprises an electric motor with a rotor connected to said delivery wheel such that said rotor and said delivery wheel rotate in unison; and
said hot gas delivery device, axially between said delivery wheel and said electric motor in relation to the axis of rotation, comprises a cooling chamber integrated into said delivery device cooling air path;
said housing defines an interior space of said hot gas delivery device;
said electric motor is arranged in said interior space;
at least a portion of said cooling path is located in said interior space;
at least a portion of said delivery device hot gas path is located in said interior space.

14. The fuel cell system in accordance with claim 13, wherein:
said hot gas delivery device comprises a cooling disk arranged in said cooling chamber and connected to said rotor in such a way that said cooling disk and said rotor rotate in unison;
said cooling disk is arranged in said interior space.

15. The fuel cell system in accordance with claim 13, wherein:
said hot gas delivery device comprises an additional delivery device cooling air path, which is integrated into said reformer air line or into said cathode air line and through which the reformer air or the cathode air flows;
said hot gas delivery device comprises a cooling jacket;
said cooling jacket is arranged in said interior space;
said electric motor comprises a stator;
said electric motor is enveloped by said cooling jacket, said cooling jacket being integrated into said additional delivery device cooling air path;
at least one of the reformer air and the cathode air provided in the cooling path is unmixed with the anode waste gas in the hot gas path.

16. The fuel cell system in accordance with claim 15, wherein:
said delivery wheel is arranged in a delivery chamber which is integrated into said delivery device hot gas path;
said cooling chamber is arranged axially between said delivery chamber and said cooling jacket in relation to an axis of rotation; and
said delivery wheel, said cooling chamber and said delivery chamber are located in said interior space.

17. The fuel cells system in accordance with claim 10, wherein said hot gas delivery device delivers said anode waste gas only to said reformer.

18. A fuel cell system, as an auxiliary power supply unit of a motor vehicle, the fuel cell system comprising:
a reformer for generating a reformate gas from reformer air and fuel;
a fuel cell for generating electric current from cathode air and reformate gas, said fuel cell comprising a cathode side and an anode side;
an air delivery device for delivering air;
a reformer air line;
a cathode air line;
an air supply device receiving ambient air from the surrounding area of the fuel cell system by said air delivery means and splitting the air at least into reformer air and cathode air and sending the reformer air via said reformer air line in a direction of said reformer and sending said cathode air via said cathode air line in a direction of said cathode side;
a recirculating line connecting said anode side to said reformer and recycling anode waste gas from said fuel cell to said reformer;
a hot gas delivery device arranged in said recirculating line, said hot gas delivery device being configured to deliver said anode waste gas to said reformer, said hot gas delivery device comprising an interior space, wherein said anode waste gas passes through said interior space along one fluid flow path and at least one of said reformer air and said cathode air passes through said interior space along another fluid flow path, said one fluid flow path being separate from said another fluid flow path in said interior space.

19. The fuel cell system in accordance with claim 18, wherein said hot gas delivery device delivers said anode waste gas only to said reformer, said another fluid flow path being integrated into said reformer air line or into said cathode air line, said one fluid flow path being sealed against said another fluid flow path.

20. The fuel cell system in accordance with claim 18, wherein at least one of said reformer air and said cathode air provided in said another fluid flow path does not mix with said anode waste gas in said one fluid flow path, wherein said hot gas delivery device comprises a housing, said housing comprising a hot gas path outlet and a cooling path outlet, said cooling path outlet being at a spaced location from said hot gas path outlet, said housing comprising a cooling path inlet and a hot gas path inlet, said cooling path inlet being located at a spaced location from said hot gas path inlet.

* * * * *